United States Patent [19]

Marlor

[11] Patent Number: 5,341,941
[45] Date of Patent: Aug. 30, 1994

[54] COMBINED STORAGE AND EXERCISE-THERAPY APPARATUS

[76] Inventor: Thomas W. Marlor, 10000 Southern Mill Pl., Grass Valley, Calif. 95949

[21] Appl. No.: 82,997

[22] Filed: Jun. 28, 1993

[51] Int. Cl.⁵ .............................................. A47F 7/00
[52] U.S. Cl. ........................................ 211/13; 211/88
[58] Field of Search .......................... 211/13, 88, 71; 248/205.2, 176

[56] References Cited

U.S. PATENT DOCUMENTS

| | | |
|---|---|---|
| 4,712,693 | 12/1987 | Striplin . |
| 4,838,505 | 6/1989 | Lowe . |
| 4,852,746 | 8/1989 | Wells et al. . |
| 4,911,389 | 3/1990 | Self . |
| 4,991,817 | 2/1991 | VonKleist et al. . |
| 4,991,892 | 2/1991 | Burrell . |
| 5,082,229 | 1/1992 | Dahl . |
| 5,125,516 | 6/1992 | McKenna ............................ 211/13 |
| 5,127,615 | 7/1992 | Jones . |

*Primary Examiner*—Alvin C. Chin-Shue
*Assistant Examiner*—Sarah A. Lechok
*Attorney, Agent, or Firm*—James M. Ritchey

[57] ABSTRACT

A storage tower for holding an item, including a plurality of supporting side walls, an upper platform secured to the side walls, and grasping passages for handling the tower. Items are releasably secured to the tower. One type of item that may be attached to the tower is a hand exercise and manipulation device.

15 Claims, 5 Drawing Sheets

COMBINED STORAGE AND EXERCISE-THERAPY APPARATUS

BACKGROUND OF THE INVENTION

1. Field of the Invention

A easily manipulated storage apparatus for holding a plurality of items is related. Specifically, items such as remote control units for electronic equipment and such small items or hand exercise means are reversibly secured to the supporting side walls on a storage tower that includes a hollow interior and an upper platform.

2. Description of the Background Art

Numerous contraptions have been designed to store, carry, or transport small items such as remote control devices. However, all of the prior inventions fail to have the versatility of the subject device. Specifically, U.S. Pat. No. 4,712,693 discloses a remote control unit console that holds three remote control devices. Mounted to a base member is a rotatable series of mounting surfaces.

U.S. Pat. No. 4,838,505 relates a remote control holder with multiple sides. An central opening pierces the structure and functions to hold a program guide.

An orientation and storage apparatus for remote control units is described in U.S. Pat. No. 4,852,746. A plurality of receiving slots are configured around a central supporting body. An internal storage volume is provided within the central body.

Disclosed in U.S. Pat. No. 4,911,389 is an instrument bracket assembly. Comprising the assemble are two opposing base members. Each base member has finger elements that cooperate with one another to form an interlocking structure that secures the instrument, with the aid of mating VELCRO strips.

U.S. Pat. No. 4,991,817 recites a caddy for remote control units. A ramped upper surface is attached to a supporting base. The upper surface is coated with a high friction material. Within the base is a volume for storing a program guide. Remote control units sit on the upper surface.

U.S. Pat. No. 4,991,892 specifies a remote control holder having a plurality of elongated support members attached to a central integral body. Remote control units are secured to the elongated members' outer surfaces. Gaps are formed between the elongated members and are wide enough to receive a hand of a user.

A holder for remote control units and magazines is illustrated in U.S. Pat. No. 5,082,229. A generally flat device serves to hold open a magazine at a desired page and to support a series of remote control units.

U.S. Pat. No. 5,127,615 presents a remote control holder. The apparatus is basically a C-clamp have variable width positions. VELCRO securement means are included.

SUMMARY OF THE INVENTION

An object of the present invention is to provide a versatile storage tower with ease of handling.

Another object of the present invention is to produce an inexpensive, lightweight, and strong storage tower.

A further object of the present invention is to disclose a storage tower that permits a user to select numerous items for reversible attachment to the tower's surface.

Still another object of the present invention is to relate a combined storage tower and a hand exercise or physical therapy device.

Yet a further object of the present invention is to communicate a storage tower having an upper platform for supporting or fastening objects and an internal storage volume.

Yet still a further object of the present invention is to disclose a storage device that permits a user to firmly grasp it by any of its sides or top.

Disclosed is a storage device or tower, comprising a plurality of supporting side walls with each side wall having inner and outer surfaces, a narrow top border, a wide bottom border, and first and second side borders. The first side border of each the side wall is secured to at least a portion of the second side border of another the side wall to form a generally truncated pyramidal-shaped structure or storage tower.

First means are provided for grasping the tower via the side walls. The first means for grasping the tower comprises a plurality of side apertures formed in the supporting side walls.

Included in the subject apparatus is an upper platform having inner and outer surfaces and a plurality of side edges. Usually, the plurality of the side edges equals the plurality of supporting side walls and the upper platform is secured to the supporting side walls.

Also, included are second means for grasping the tower via the upper platform. The second grasping means comprises a plurality of upper apertures formed in the upper platform. Each of the side apertures aligns with one of the upper apertures to produce a grasping passage.

Standard item may be attached to the tower by releasable means. Such items include, but are not limited to remote control units, clocks, note pads, pill storage container, calculators, earrings, sewing items, miniature radios and televisions, hearing assistance devices, thermometers, calendars, and the like. In particular, a preferred item for attachment comprises means for assisting a user in exercising the user's hand. A method of exercising by a user the tower comprises attaching the exercise assistance means to the tower and manipulating the exercise assistance means. After using the exercising means the user may remove the exercising means or exchange with another type.

Generally, an internal storage volume is provided within the plurality of supporting side walls.

Other objects, advantages, and novel features of the present invention will become apparent from the detailed description that follows, when considered in conjunction with the associated drawings.

DESCRIPTION OF THE PREFERRED EMBODIMENT

Figure 1:
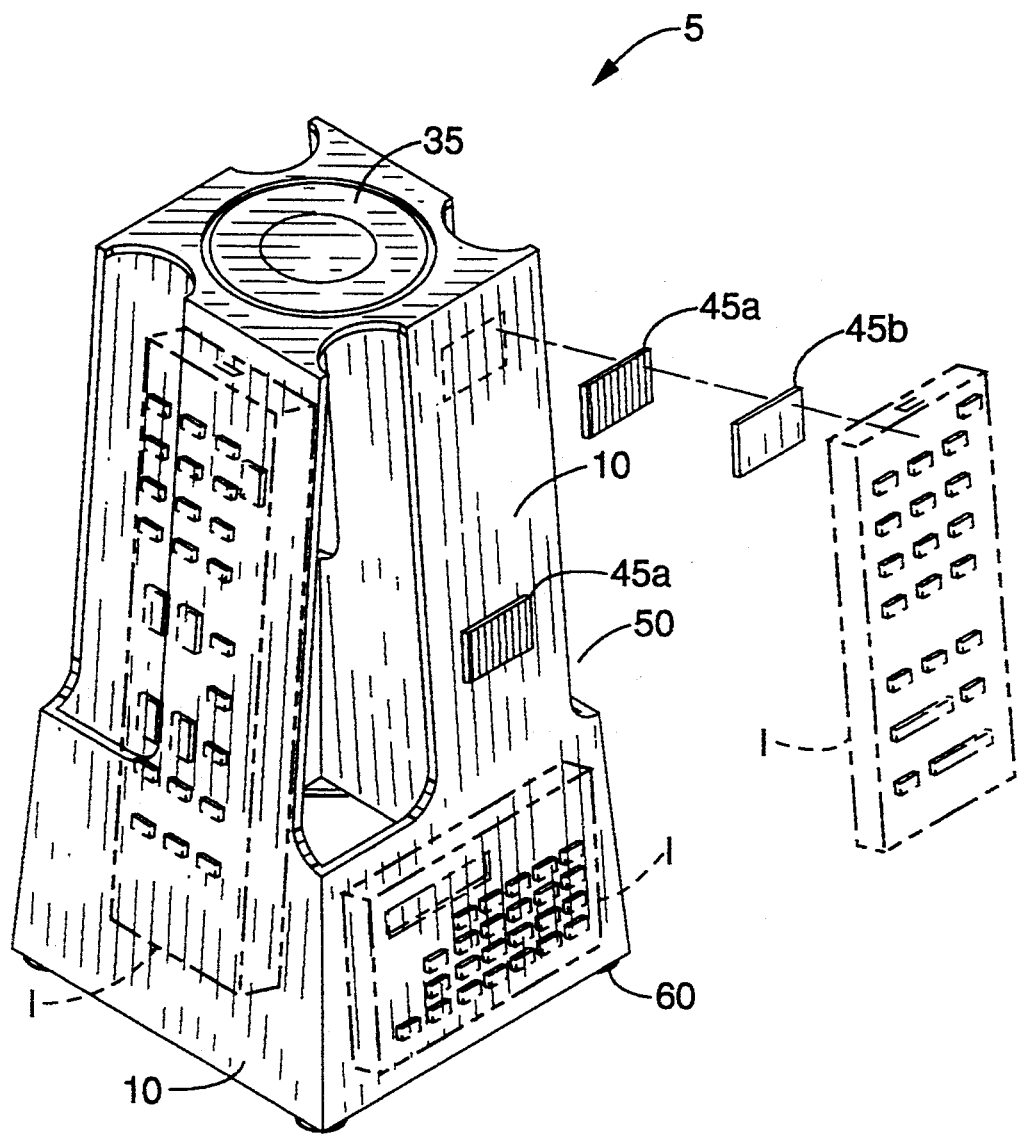
FIG. 1 is a perspective view of the subject invention showing releasably attached items and the storage tower.

Referring now to FIGS. 1-6, there are shown preferred embodiments of a combined storage and exercise therapy apparatus. The basic configuration of the subject apparatus is that of a storage carrier for small items. In particular the subject invention presents a novel means of providing to a user not only a handy storage site for small items such as remote control units and the like, but also a convenient apparatus for hand exercise therapy. For example, a user employing the subject apparatus might have several items associated with controlling a television, stereo, and like attached to the subject storage tower. The user may be sitting in a chair or bed by choice or by physical necessity and have the subject apparatus within reach of that location. By having both the remote control units and hand therapy assemblies near-by the user is encouraged to utilize often the therapy means.

Comprising the subject device is a generally vertical storage tower 5 to which items I are reversibly or releasably fastened. The tower 5 has a plurality of supporting side walls 10. Each side wall 10 has outer and inner surfaces, a top border 15, a bottom border 20, and first 25 and second 30 side borders. Generally, the form of the tower is that of a truncated pyramidal-shaped structure, however, other configurations are within the domain of this disclosure.

An upper platform 35 is secured to of proximate to the side wall top borders 15. The upper platform has outer and inner surfaces and a plurality of side edges 40. Usually, the plurality of platform side edges 40 equals the plurality of supporting side walls 10. As seen in figures, the plurality of side walls 10 and platform edges 40 are four, however, three, five, six, or a larger number is considered within the realm of this disclosure. Usually, a condensation channel 37 is formed in the outer surface of the platform 35. The condensation channel 37 serves to collect condensed moisture that might drip off a cold container placed on the platform 35. Further, included in the upper platform 35 is an indicia or marker area 38 that is utilized to display desired symbols, pictures, initials, trademarks, logos, and the like. Customarily, the indicia or marker 38 is set flush with the upper platform's 35 outer surface to permit articles to be set on the platform 35 without interference.

The subject tower is fabricated from materials such as metals and metal alloys, wood and wood products, natural and synthetic polymers, and equivalent substances. Preferably a durable plastic-type material is employed to produce the subject device.

Although the subject tower may be described is terms of having a plurality of separate side walls 10 and an upper platform 35, it is understood that the tower is preferably formed (by extrusion, molding, and equivalent means) as a single unit, wherein the walls 10 extent into one another and the upper platform 35 to form the unitized tower body. However, individual side walls 10 may be assembled into the tower by attaching or securing the side walls 10 to one another by at least a portion the side borders of each. Generally, the attaching or securing of side walls 10 to one another and to the platform 35 is by appropriate standard means such as gluing, melting, welding, nailing, screwing, and the like depending upon the nature of the fabrication materials and structural considerations. Usually, the first side border 25 of one wall 10 is secured to a second side border 30 of another wall 10 and this continues on from one wall 10 to the next wall 10 until the plurality of walls 10 meet to form the tower.

Means are provided or releasable securing the various items I to the tower 5. Preferably, the releasable securing means comprises a VELCRO-type system of hooks and loops or magnets secured by suitable means to the tower's outer surface, but other fastener means such as snaps, clasps, glue, prongs, and the like are appropriate. For example, with VELCRO, one strip 45a of the mating materials is attached to the tower 5 and the other strip 45b of the mating material to the item I (see FIG. 1).

To manipulate and pick-up the storage tower 5 grasping means are included. Since the tower 5 is often utilized to hold remote control devices, the subject device is configured to fit easily a hand of a user. Grasping means comprising apertures 50 are formed in the supporting side walls 10. Each aperture 50 may be located at or in the first side border 25 of each wall 10 or, as is specifically shown in the figures, consist of a combined opening that is partially at or in the first side border 25 of one wall 10 and partially at or in the second side border 30 of another wall 10, located at the side wall-to-wall corner. Although the preferred aperture 50 is formed at the side wall-to-wall connection corners of the tower 5, alternate embodiments may have the aperture proximate each tower side wall-to-wall corner and not extending into an through the actual corner. The aperture 50 permits a user to pass fingers beneath a side wall 10 and to grasp that wall 10. Normally, the tower 5 is symmetrical with an aperture 50 at each side wall-to-wall corner. Generally, each side wall-to-wall corner has an aperture 50, however, since the tower 5 is constructed from a plurality of side walls 10, some of the side wall-to-wall corners may not have an aperture or may have an aperture off-set from the wall-to-wall corner and into the wall 10.

In addition to the first grasping means above (the side wall-to-wall apertures 50), second grasping means are provided in the upper platform 35 of the subject apparatus 5. The second grasping means comprises a plurality of upper apertures 55 formed in the upper platform 35. Preferably, each upper platform edge has an aperture 55 that aligns with one of the side wall apertures 50 to produce a grasping passage through which a user inserts fingers for manipulation of the tower 5 and the items I attached to the tower 5. The presence of the upper apertures significantly assists a user in picking up the device 5 from directly above. The user's fingers easily mate into the upper apertures 55 for lifting.

The tower 5 is usually hollow and thus provides an internal storage volume in its interior space within the plurality of supporting side walls 10. This internal storage volume permits the user to place the tower 5 over objects such as a bottle, drinking glass, can, and the like.

Figure 6:
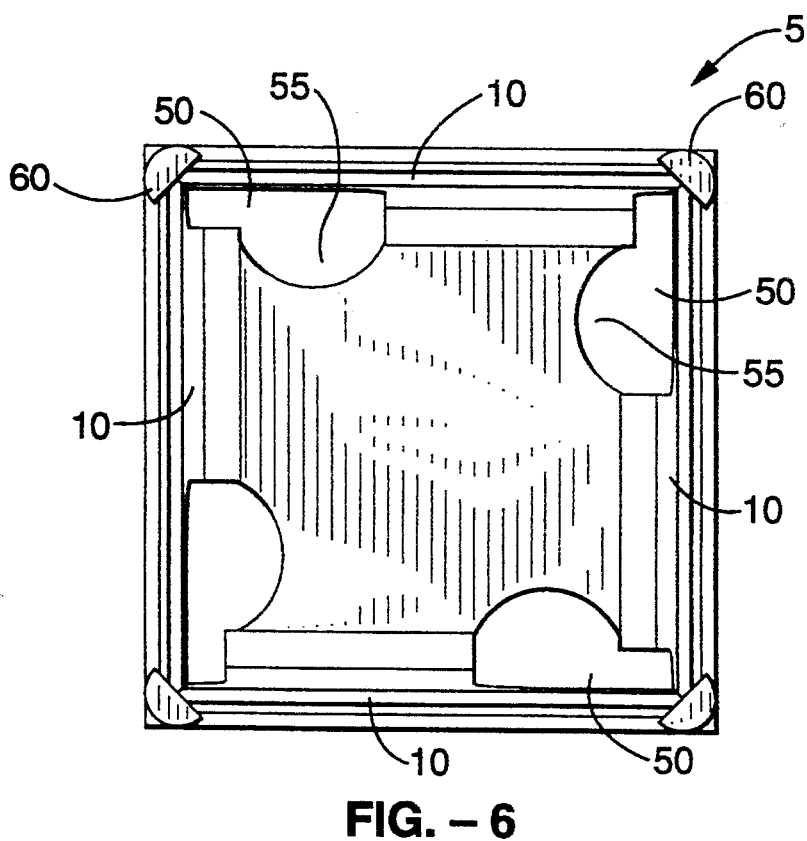
FIG. 6 is a bottom view of the subject invention.

To provide traction and protection from scratching, foot pads 60 are generally incorporated into the subject device 5. The pads 60 are attached is standard manners and at any continuous or discontinuous location on the tower's bottom perimeter edge. FIG. 6 shows the pads 60 positioned at the corners of the bottom perimeter edge.

Since the subject tower is so versatile, it may be employed on marine craft. A floatation device is fitted to the subject tower 5 when it is used near the water. A preferred manner of fitting with a floatation device comprises partially inserting a float within the internal storage volume of other equivalent means.

Figure 2:
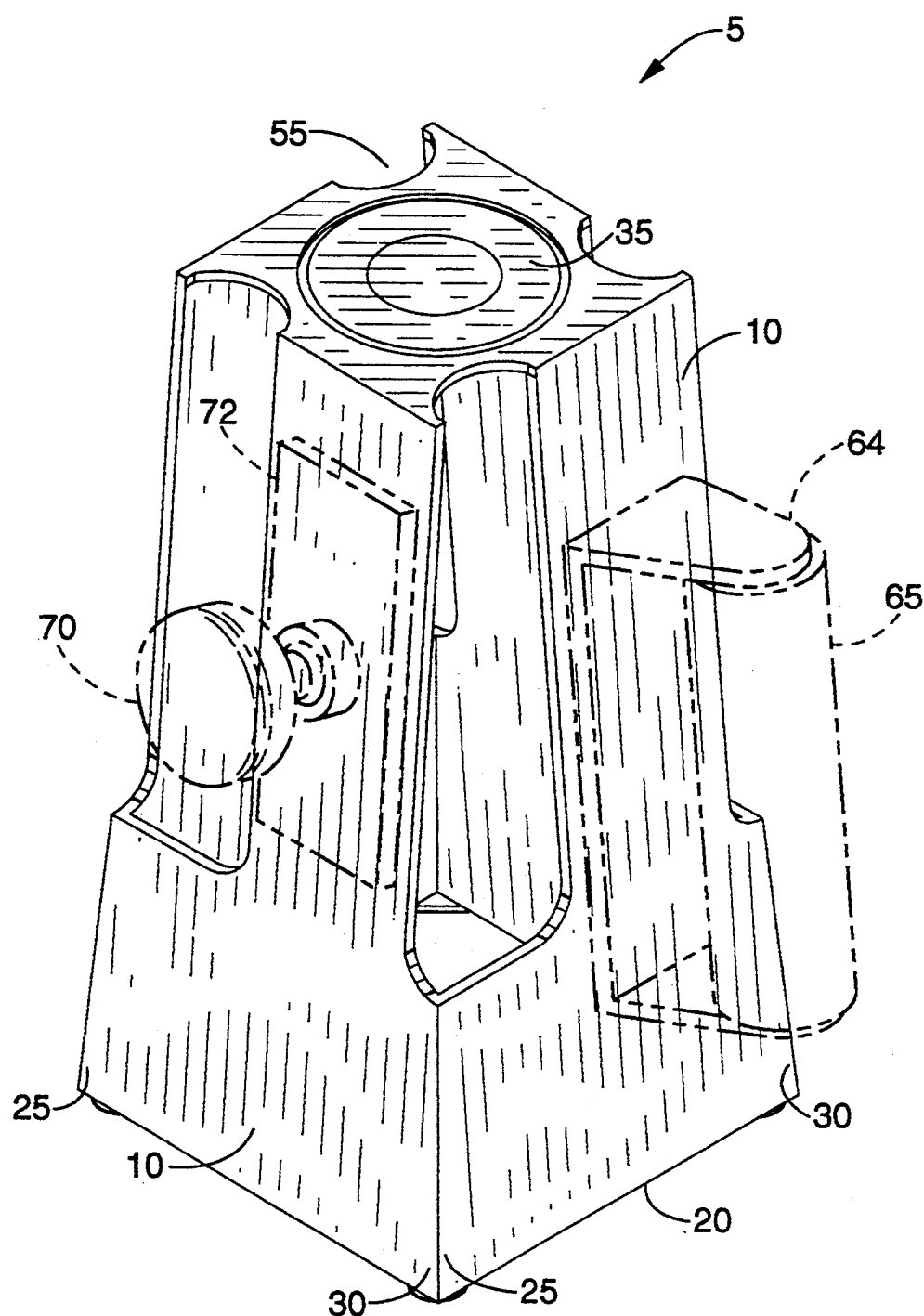
FIG. 2 is a perspective view of the subject invention showing exercise items releasably attached to the storage tower.
Figure 3:
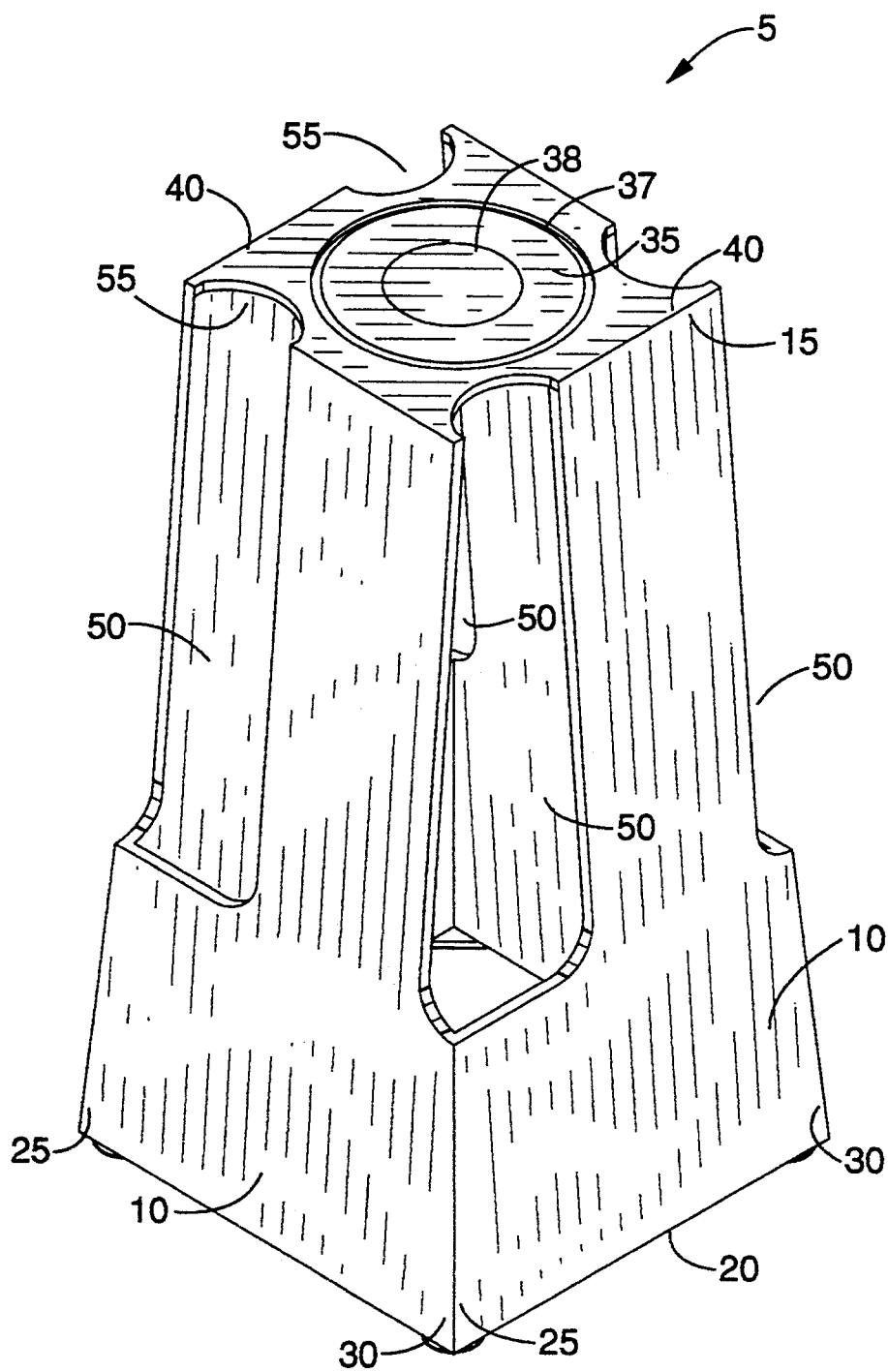
FIG. 3 is a perspective view of the subject invention
Figure 4:
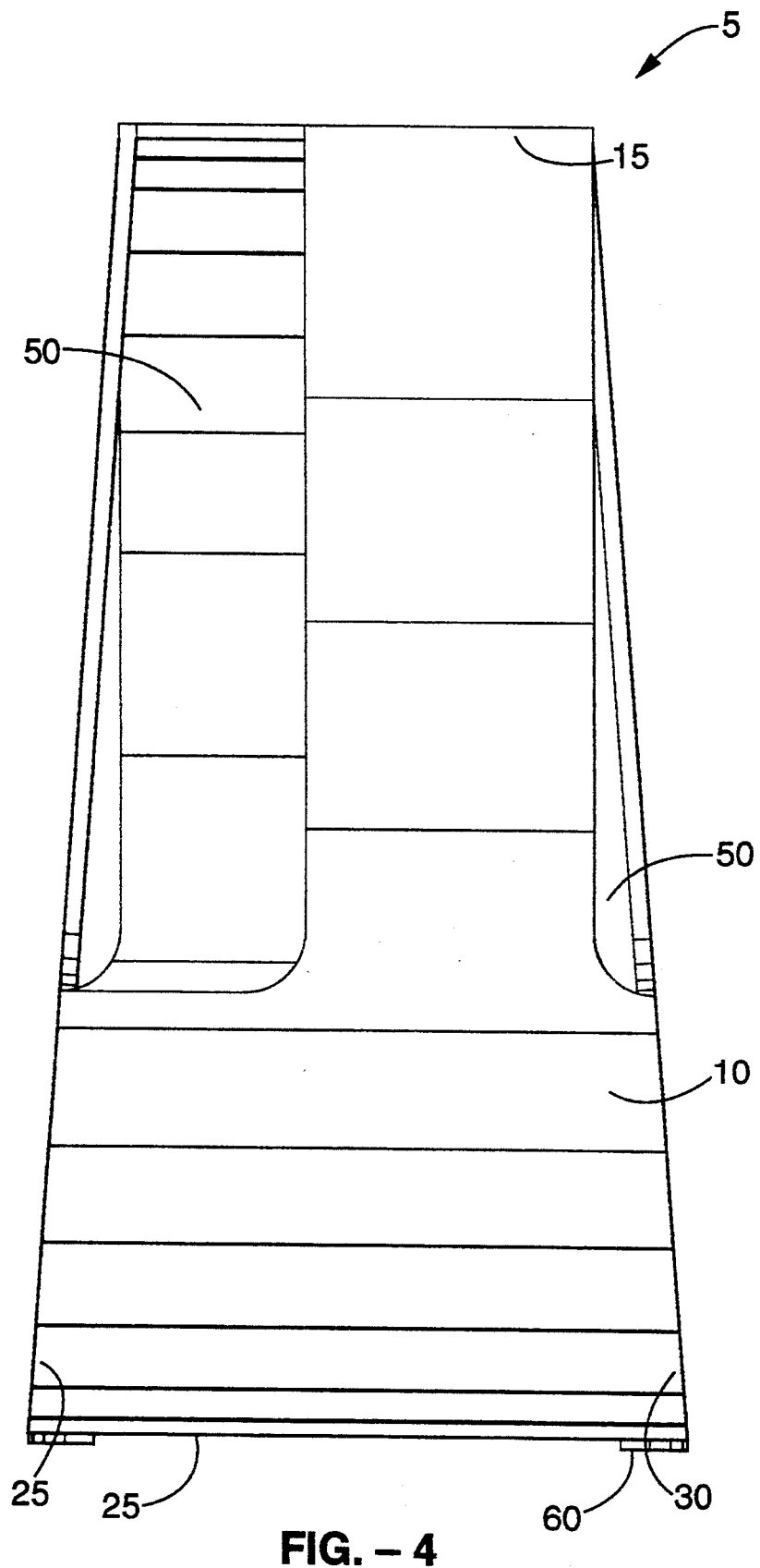
FIG. 4 is a side view of the subject invention, with all sides identical.
Figure 5:
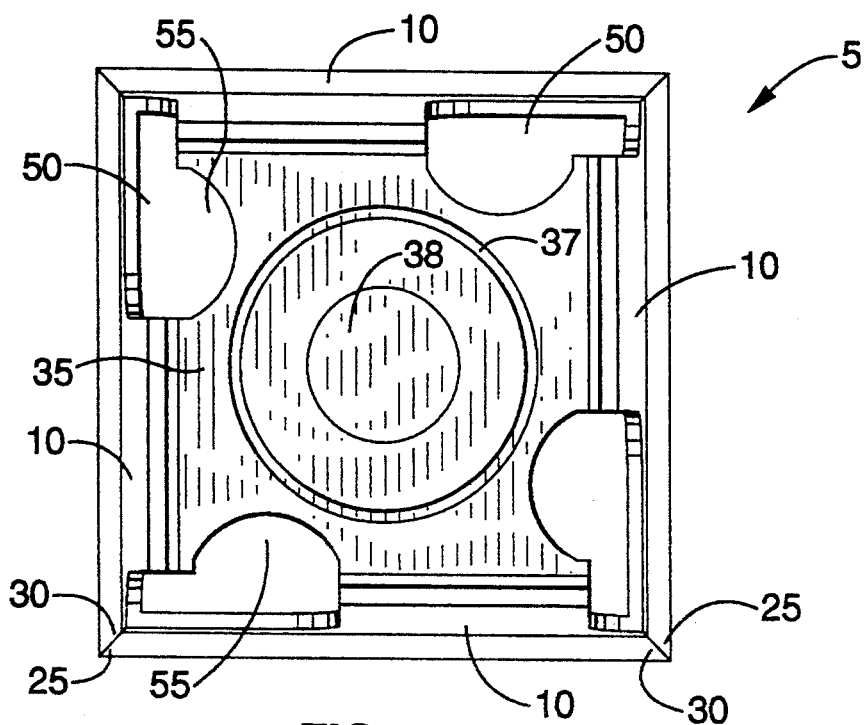
FIG. 5 is a top view of the subject invention.

As noted above, the subject device is tremendously versatile in what can be releasably fastened to its surfaces (either side walls 10 or upper platform 35). One extremely useful type of custom item that is secured to the tower surfaces comprises hand exercise or physical therapy devices or general exercise assistance means. Shown in FIG. 2 is a hand grip strengthening items releasably fastened to the tower 5. The hand grip strengthening item comprises an attachment base 64 with tower attachment means secured to it and a central body 65 for gripping attached to the base. A user grips the central body 65 for exercise or physical therapy purposes. An additional depicted example of therapy items comprises a knob 70 rotationally mounted to a base 72 which is releasably secured to the tower 5. As with the grip base 64, the knob base 72 is releasably secured to the tower 5 by appropriate releasable means. The rotational mounting comprises a spring loaded resistance to rotation, thereby giving a user exercise in hand twisting motions. Numerous other types of exercise and physical therapy items can be adapted to be releasably secured to the tower 5 such as; block fitting devices, finger exercise and coordination means, and equivalent devices.

Generally, a method of employing the tower 5 as an exercise or physical therapy device comprises attaching the exercise assistance means to the tower and then manipulating the exercise assistance means in an appropriate manner. An additional step in the method comprises removing the exercise assistance means from the tower.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A storage apparatus for holding an item, comprising:
   a) a plurality of supporting side walls, wherein each of said supporting side walls has a top border, a bottom border, and first and second side borders, wherein said first side border of each said side wall is secured to at least a portion of said second side border of another said side wall;
   b) an upper platform secured to said side wall top borders;
   c) means for releasable securing said item to said apparatus; and
   d) first means for grasping said apparatus, wherein said first means for grasping said tower comprises a plurality of side apertures formed in said supporting side walls.

2. A storage tower according to claim 1, further comprising second means for grasping said tower via said upper platform.

3. A storage tower according to claim 2, wherein said second grasping means comprises a plurality of upper apertures formed in said upper platform.

4. A storage tower according to claim 3, wherein each of said side apertures aligns with one of said upper apertures to produce a grasping passage.

5. A storage tower for holding an item, comprising:
   a) a plurality of supporting side walls with each side wall having a top border, a bottom border, and first and second side borders, wherein said first side border of each said side wall is secured to at least a portion of said second side border of another said side wall;
   b) first means for grasping said tower via said side walls;
   c) an upper platform having upper and lower surfaces and a plurality of side edges, wherein said plurality of said side edges equals the plurality of supporting side walls and said upper platform is secured to said supporting side walls; and
   d) means for releasable securing said item to said tower.

6. A storage tower according to claim 5, wherein said first means for grasping said tower comprises a plurality of side apertures formed in said supporting side walls.

7. A storage tower according to claim 5, further comprising second means for grasping said tower via said upper platform.

8. A storage tower according to claim 7, wherein said second grasping means comprises a plurality of upper apertures formed in said upper platform, wherein each of said side apertures aligns with one of said upper apertures to produce a grasping passage.

9. A storage tower for holding an item, comprising:
   a) a plurality of supporting side walls with each side wall having inner and outer surfaces, a narrow top border, a wide bottom border, and first and second side borders, wherein said first side border of each said side wall is secured to at least a portion of said second side border of another said side wall to form a generally truncated pyramidal-shaped structure;
   b) first means for grasping said tower via said side walls;
   c) an upper platform having upper and lower surfaces and a plurality of side edges, wherein said plurality of said side edges equals the plurality of supporting side walls and said upper platform is secured to said supporting side walls;
   d) second means for grasping said tower via said upper platform;
   e) means for releasable securing the item to said outer tower surface; and
   f) an internal storage volume within said plurality of supporting side walls.

10. A storage tower according to claim 9, wherein said first means for grasping said tower comprises a plurality of side apertures formed in said supporting side walls.

11. A storage tower according to claim 10, wherein said second grasping means comprises a plurality of upper apertures formed in said upper platform, wherein each of said side apertures aligns with one of said upper apertures to produce a grasping passage.

12. A storage tower, comprising:
   a) a plurality of supporting side walls with each side wall having inner and outer surfaces, a narrow top border, a wide bottom border, and first and second side borders, wherein said first side border of each said side wall is secured to at least a portion of said second side border of another said side wall to form a generally truncated pyramidal-shaped structure;
   p1 b) first means for grasping said tower via said side walls, wherein said first means for grasping said tower comprises a plurality of side apertures formed in said supporting side walls;
   c) an upper platform having inner and outer surfaces and a plurality of side edges, wherein said plurality of said side edges equals the plurality of supporting side walls and said upper platform is secured to said supporting side walls;

d) second means for grasping said tower via said upper platform, wherein said second grasping means comprises a plurality of upper apertures formed in said upper platform, wherein each of said side apertures aligns with one of said upper apertures to produce a grasping passage;
e) an item for attachment to said outer wall or outer platform surfaces;
f) means for releasable securing said item to said tower; and
g) an internal storage volume within said plurality of supporting side walls.

13. A storage tower according to claim 12, wherein said item for attachment comprises means for assisting a user in exercising said user's hand.

14. A method of utilizing by a user said tower according to claim 13, comprising the steps of:
a) attaching said exercise assistance means to said tower and
b) manipulating said exercise assistance means.

15. A method according to claim 14, further comprising the step of removing said exercise assistance means from said tower.

* * * * *